United States Patent
Gao

[11] Patent Number: 5,431,116
[45] Date of Patent: Jul. 11, 1995

[54] PNEUMATIC TRANSPLANTER

[75] Inventor: Jianhua Gao, Lexington, N.C.

[73] Assignee: New Century Technology Corporation, Lexington, N.C.

[21] Appl. No.: 143,462

[22] Filed: Oct. 26, 1993

[51] Int. Cl.⁶ .............................................. A01C 11/02
[52] U.S. Cl. ........................................ 111/105; 221/211
[58] Field of Search ............... 111/100, 104, 105; 221/211; 47/1 M, 1 A, 1.01; 406/151–153

[56] References Cited

U.S. PATENT DOCUMENTS

| | | |
|---|---|---|
| 3,446,164 | 5/1969 | Huang et al. . |
| 4,130,072 | 12/1978 | Dedolph . |
| 4,215,513 | 8/1980 | Dedolph . |
| 4,388,035 | 6/1983 | Cayton et al. . |
| 4,440,101 | 4/1984 | Edwards et al. . |
| 4,843,983 | 7/1989 | Olson . |
| 5,121,701 | 6/1992 | Reed et al. . |
| 5,179,800 | 1/1993 | Huang . |
| 5,209,170 | 5/1993 | Kobayashi . |
| 5,215,550 | 6/1993 | Tesch, Jr. et al. . |
| 5,254,140 | 10/1993 | Huang ................. 47/1 A |

FOREIGN PATENT DOCUMENTS

87/06791  11/1987  WIPO .................. 111/105

OTHER PUBLICATIONS

Publication by "American Society of Agricultural Engineers" entitled Effects of Air-Pruning on Cutting and Seedling Growth dated Jun. 26–29, 1988.
Narrative by James R. Hammerle and Barney K. Huang entitled "Fully Automatic Greenhouse Transplanter for Air-Pruned Seedlings" undated.

*Primary Examiner*—Randolph A. Reese
*Assistant Examiner*—Spencer Warnick
*Attorney, Agent, or Firm*—Rhodes, Coats & Bennett

[57] ABSTRACT

A pneumatic seedling transplanter comprising a beating plate for a tray of seedlings to be planted in which the tray has open portions below the seedlings and the bearing plate has at least one opening which can be aligned with the open portions of the tray to permit a seedling to be dropped from the tray through the opening in the bearing plate, a guide tube below the opening in the bearing plate for guiding a dropped seedling downward to be planted, and a source of suction selectively applicable to the guide tube as an impulse of suction to quickly release the seedling to be planted from the tray and induce the seedling to fall through the opening in the bearing plate and into the guide tube and to continue to fall through the guide tube under the influence of gravity, the source of suction including first and second annular chambers, and a vacuum chamber in communication with the guide tube, whereby expansion of one of the annular chambers expands the vacuum chamber to create the impulse of suction and expansion of the other annular chamber returns the vacuum chamber to its initial size.

16 Claims, 7 Drawing Sheets

PNEUMATIC TRANSPLANTER

BACKGROUND OF THE INVENTION

Mechanization and adoption of new technologies on farms have contributed to the decrease in human labor requirements and increased efficiency. Nonetheless, plantbed and transplanting operations for both greenhouse and field crops remain a major bottleneck in the production systems of vegetables, tobacco, trees and various floricultural and field crops. Many attempts have been made worldwide to develop fully automated transplanters and seedling production systems, but to date none of the dry-land, fully automatic transplanters and automated seedling culturing systems have been adopted and implemented by the industry and/or are in commercial production. Mechanical type automatic transplanters have been commercially available for the past two decades, however, some designs impart a tilt to the seedling, resulting in adverse affects. Demand for increased crop production per unit area worldwide has increased the need for a new approach to the design of an automatic crop transplanter for rice, as well as transplanters for general use.

SUMMARY OF THE INVENTION

The present invention fulfills this need in the art by providing a seedling transplanter including a bearing plate for a tray of seedlings to be planted in which the tray has open portions below the seedlings and the bearing plate has at least one opening which can be aligned with the open portions of the tray to permit a seedling to be dropped from the tray through the opening in the bearing plate. A guide tube below the opening in the bearing plate guides a dropped seedling downward to be planted, and a source of suction is selectively applicable to the guide tube as an impulse of suction to quickly release the seedling to be planted from the tray and induce the seedling to fall through the opening in the bearing plate and into the guide tube and to continue to fall through the guide tube under the influence of gravity.

Preferably, the source of suction's impulse expires quickly so that after being loosened from the tray, the seedling falls through the guide tube substantially free of suction as the impulse expires. Also preferably, the source of suction has radially symmetrically arrayed ports to the guide tube to provide a suction impulse in the region of the seedling substantially free of a lateral component which could impart a lateral trajectory to the seedling.

In a preferred embodiment the bearing plate has a height adjustment, to enable the height and, therefore, the potential energy of the seedling to be transplanted to be adjusted as desired.

In one embodiment the guide tube has an upstream portion and a downstream portion and the upstream portion has a smaller lumen than the downstream portion.

Various sources of suction are specifically contemplated. In one embodiment the source of suction includes an axially movable extension of the guide tube. An outer tube larger in diameter than the guide tube has the guide tube and the extension within and has a closure at its upper end to close the annulus between the guide tube and outer tube. Upper, medial and lower rings providing sliding seals between the outer tube and the extension, thereby defining upper, lower and medial annular chambers between the tubes and above the respective rings. A suction port from the upper annular chamber to the guide tube permits suction to be applied from the upper annular chamber to the guide tube, and compressed fluid supply ports are fitted to the lower and medial annular chambers so that compressed fluid may be selectively supplied to either chamber. Upon application of compressed fluid to the lower chamber when the extension is at an upper position, the extension moves to a downward position extended from the guide tube, enlarging the upper annular chamber and drawing suction through the port from the guide tube.

The upper and lower rings are typically fixed to the extension and have seals that permit sliding motion with respect to the outer tube, and the medial ring is fixed to the outer tube and has a seal that permits sliding motion with respect to the extension.

Preferably the guide tube has a closure adapted to close when suction is applied to the guide tube and to open when suction is released. In a preferred embodiment the closure is flexible. The closure may be located on the extension.

The transplanter preferably also includes a compressed fluid supply having a control to selectively apply compressed air to the lower annular chamber to move the extension to the lower position to remove a seedling from the tray and subsequently to apply compressed air to the medial annular chamber to return the extension to the upper position, ready for a subsequent transplanting.

In an alternate embodiment, the source of suction includes an inner tube larger in diameter than the guide tube and having the guide tube within and having a closure at its upper end to close the annulus between the guide tube and inner tube. An outer tube larger in diameter than the inner tube has the guide tube and the inner tube within and is axially movable with respect to the inner tube. Upper, medial and lower rings provide sliding seals between the inner and outer tubes, thereby defining lower and upper annular chambers between the tubes and between the respective rings. Compressed fluid supply ports to the lower and upper annular chambers permit compressed fluid to be selectively supplied to either chamber. Thus, upon application of compressed fluid to the upper chamber when the outer tube is at an upper position, the outer tube moves to a downward position extended from the guide tube. A closure at the bottom of the outer tube closes, forming a lower volume that enlarges as the outer tube descends, exerting suction through the guide tube.

This embodiment preferably includes a compressed fluid supply including a control to selectively apply compressed air to the upper annular chamber to move the outer tube to the lower position to remove a seedling from the tray and subsequently to apply compressed air to the lower annular chamber to return the outer tube to the upper position, ready for a subsequent transplanting.

The invention also provides a method of transplanting seedlings including supporting a tray of seedlings on a bearing plate that has at least one opening which can be aligned with open portions of the tray to permit a seedling to be dropped from the tray through the opening in the bearing plate. Then, the method includes positioning a guide tube below the opening in the bearing plate to guide a dropped seedling downward to be planted, and selectively applying an impulse of suction to the guide tube to quickly release the seedling to be planted from the tray and induce the seedling to fall through the opening in the bearing plate and into the guide tube and to continue to fall through the guide tube under the influence of gravity.

The selective applying step preferably includes terminating the impulse quickly so that after being loosened from the tray, the seedling falls through the guide tube substantially free of suction as the impulse expires.

The selective applying step may include applying the suction radially symmetrically to the guide tube to provide a suction impulse substantially free of a lateral component which could impart a lateral trajectory to the seedling.

The method may include the preliminary step of adjusting the height of the bearing plate, to adjust the height of the seedling to be transplanted and its potential energy for deformation upon planting.

The suction may expire as air inrushes past the seedling by the seedling's movement from an upstream portion of the guide tube having a smaller lumen to a downstream portion having a larger lumen.

Preferably, the suction is applied by rapidly enlarging the volume of a first chamber in communication with the guide tube, such as by admitting compressed air to a remote chamber having a wall linked to a wall of the first chamber, thereby forcing a wall of the first chamber outward. The method preferably includes returning the volume of the chamber to its original size by returning the wall to its original location, such as by admitting compressed air to another remote chamber having a wall linked to a wall of the chamber, thereby returning the wall to its original location. The method preferably also includes closing a closure for the guide tube when suction is applied to the guide tube and opening the closure when suction is released.

In another aspect the invention provides a seedling transplanter including a bearing plate for a tray of seedlings to be planted in which the tray has open portions below the seedlings and the bearing plate has at least one opening which can be aligned with the open portions of the tray to permit a seedling to be dropped from the tray through the opening in the bearing plate. A guide tube below the opening in the bearing plate guides a dropped seedling downward to be planted. A source of suction selectively applies suction to the guide tube. The source of suction includes a first chamber in communication with the guide tube and having a moveable wall so as to be capable of having its volume enlarged and a second chamber having a moveable wall so as to be capable of having its volume changed, the movable wall of the second chamber being linked to the movable wall of the first chamber. A compressed air inlet is provided for the second chamber, so that upon admission of compressed air to the second chamber, the movable wall of the second chamber moves, thereby forcing the movable wall of the first chamber outward to increase its volume and create suction in the guide tube.

The invention also provides a method of transplanting seedlings including supporting a tray of seedlings on a bearing plate that has at least one opening which can be aligned with open portions of the tray to permit a seedling to be dropped from the tray through the opening in the bearing plate, positioning a guide tube below the opening in the bearing plate to guide a dropped seedling downward to be planted, and selectively applying suction to the guide tube to release the seedling to be planted from the tray and induce the seedling to fall through the opening in the bearing plate through the guide tube. The suction is applied by rapidly enlarging the volume of a first chamber in communication with the guide tube by admitting compressed air to a remote chamber having a wall linked to a wall of the first chamber, thereby forcing a wall of the first chamber outward and creating suction for the guide tube.

The invention provides a plant transplanting system for automatically transferring groups of seedlings from air-pruning trays by pneumatic means from and through open bottoms of the supply trays, using an impulse vacuum system, that is relatively simple in construction and which is reliable and easy to use.

BRIEF DESCRIPTION OF THE DRAWINGS

The invention will be better understood from a reading of the Detailed Description of a Preferred Embodiment and a review of the drawings in which.

DETAILED DESCRIPTION OF A PREFERRED EMBODIMENT

The transplanting system utilizes air-pruning trays and pneumatic means to achieve seedling pulling and transplanting in one simple operation. Typically, seedlings are nurtured in air-pruning trays that have detachable bottom screens. Once the detachable bottom screen or perforated bottom is removed and the trays are placed in an indexing frame, the air-pruned seedlings can be automatically transplanted using an intermittent or continuous vacuum device.

The system uses a vacuum actuated automatic plant transfer/transplanting system for transferring and transplanting multiple seedlings at a time from the trays to the field. Specifically, the plant transfer/transplanting system is operative to receive air-pruning trays having a plurality of plants therein, and is capable of transplanting multiple seedlings at a time from the supply trays utilizing an impulse type vacuum force to remove seedlings from tray cells and eject them onto the field to achieve fully automated transplanting.

Figure 1:
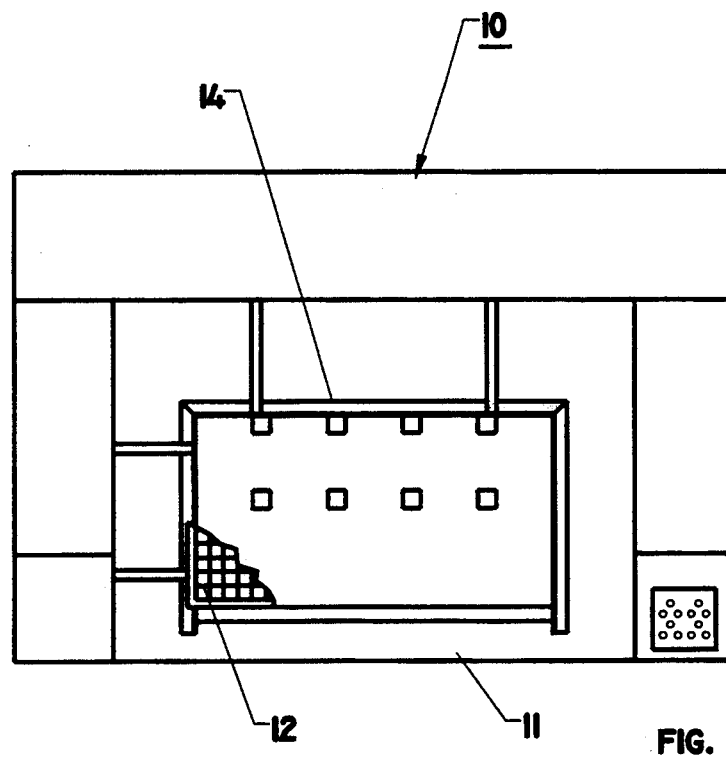
FIG. 1 is a top view of two-row eight-drop fully automated pneumatic seedling transplanter.
Figure 2:
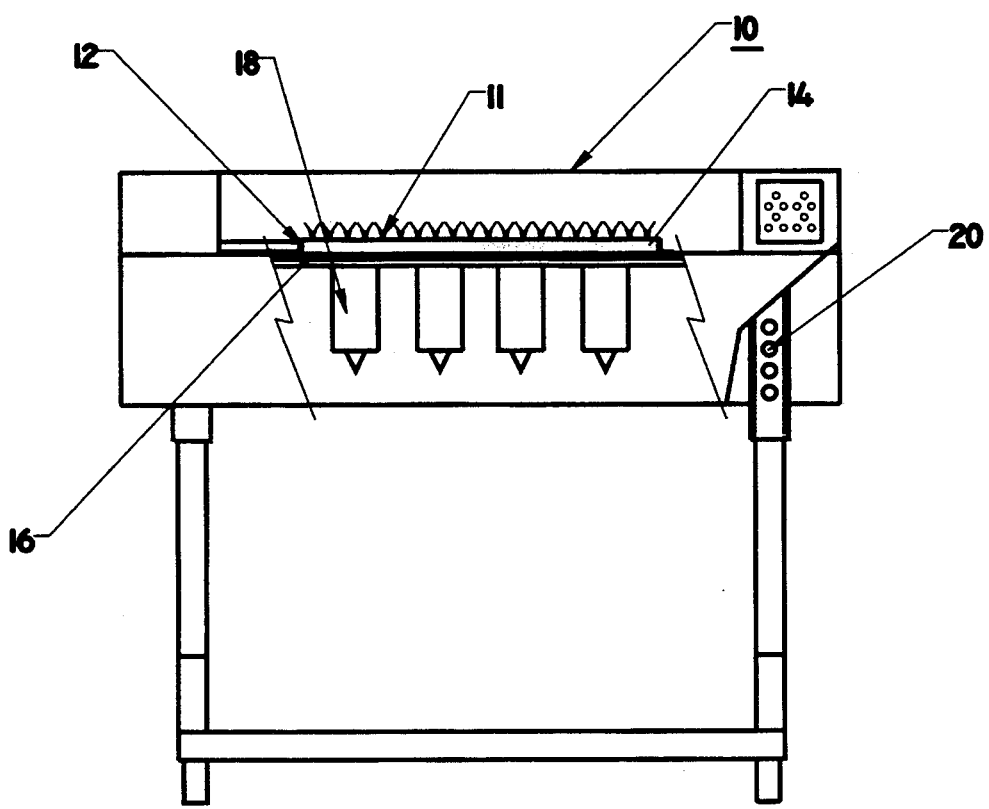
FIG. 2 is a side view of two-row eight-drop fully automated pneumatic transplanter.
Figure 3:
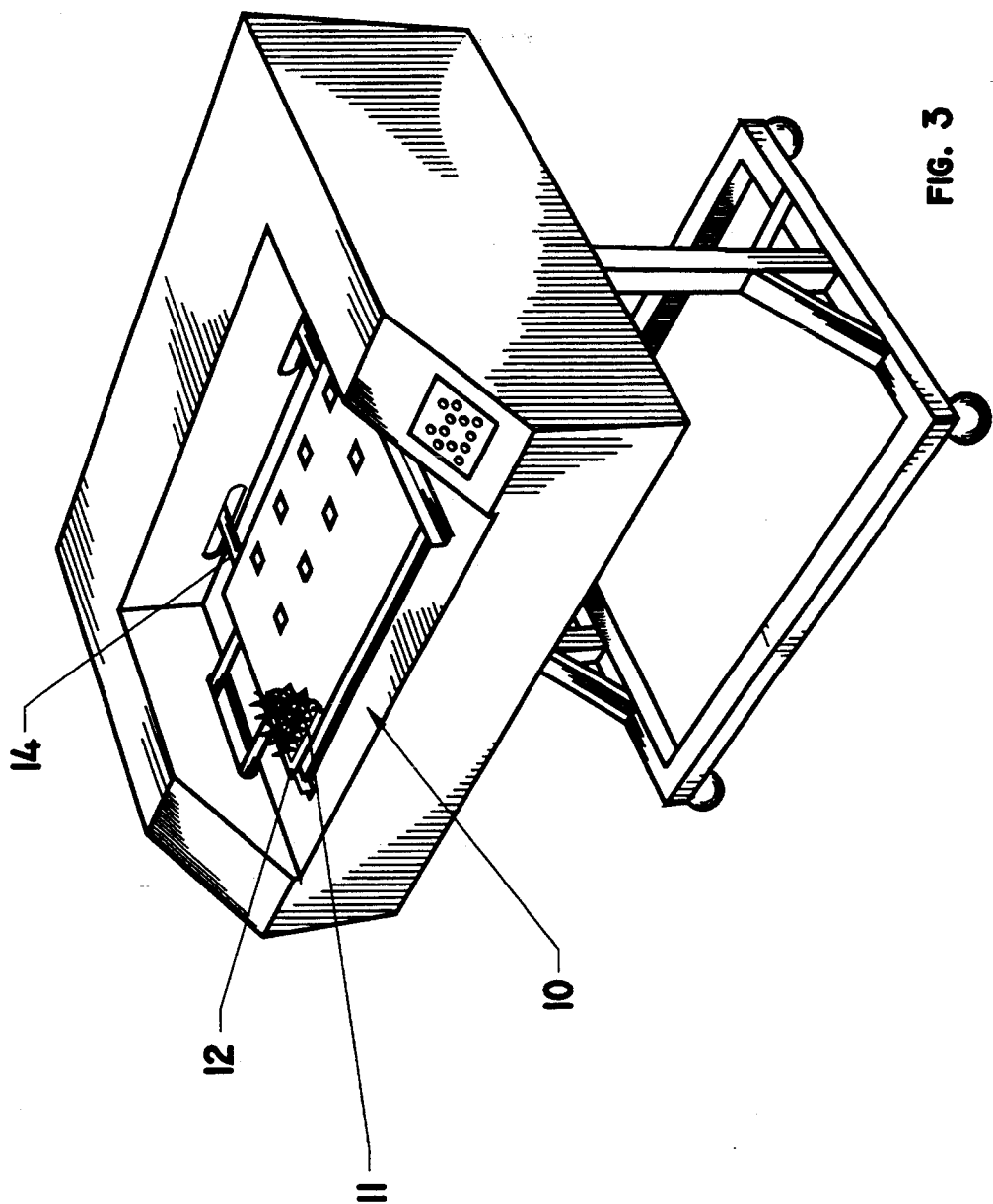
FIG. 3 is an isometric view of two-row eight-drop fully automated pneumatic transplanter.

FIGS. 1, 2 and 3 respectively illustrate the top, side and perspective views for the basic unit 10 of two-row eight-drop fully automated pneumatic transplanter. The basic unit can be designed as a replacement/upgrading unit for the conventional mechanical type automatic field transplanter or as an attachment unit for a universal prime mover. The figures also illustrate the application of the air-pruning trays to the fully automated transplanting. The machine uses one 200 cell tray at a time to remove eight seedlings simultaneously in a fraction of second in matrix formation. During the operation the plant loaded trays 12 are fitted into an indexing frame 14 over the plant bearing plate 16 of the transplanter. As the tray cells are indexed over the suction drop tubes 18, seedlings 11 are instantly dislodged from the tray cells and injected to the field. The normal height of the bearing plate 16 is about 70 cm from the ground. The height is adjustable, for example, by height adjustment sleeve 20 (see FIG. 2) to match the seedling impact to the various conditions.

The air-pruning seedling tray forms a part of transplanting system designed to transfer one or more plants at a time from a supply tray to a receiving area such as pots or a field environment. To contain and control the supply trays, the plant transfer system comprises a conventional computer controlled X-Y type indexing frame that is movable over the plant bearing plate of the transplanter for receiving and holding supply trays. The indexing frame is movably mounted and can be indexed in both X and Y directions about the bearing plate using electrical, hydraulic, mechanical or pneumatic means. The bearing plate is attached to the transplanter frame to provide supporting means for trays and seedlings. Various piston type designs (or continuous vacuum designs) can be incorporated to yield an impulse vacuum producing arrangement.

Turning to the operation of the plant transfer system, reference is first made to FIG. 1. The plant transfer system is designed to transfer 8 plants at a time. A selected matrix of eight plants overlies eight openings provided within bearing plate 16. Once in this first position, the vacuum devices 18 are actuated, causing all eight overlying plants to be pulled from the supply tray and directed into the field.

To continue the transfer of seedling cell blocks, the indexing frame moves the entire tray one plant cell increment. This allows eight additional plants to be appropriately aligned over the respective openings within bearing plate 16 that overlie tubes 18. By the same process described herein above, a second set of eight plants are directed into the field. After this, the indexing frame is again actuated and is moved one plant increment. This process continues repeatedly to plant all of the plants in the tray 12. Once the final set of eight cell blocks has been transferred, then the empty plant tray is removed from the indexing frame and replaced with a loaded plant tray.

It should be noted that the plant transfer/transplanting system can be adapted to accommodate various size trays with varying numbers of plant cells formed therein. For example, rice seedling air-pruning trays are currently commercially available in two sizes, one is 18 by 36 or 648 cells per tray, and other is 20 by 40 or 800 cells per tray.

Figure 5:
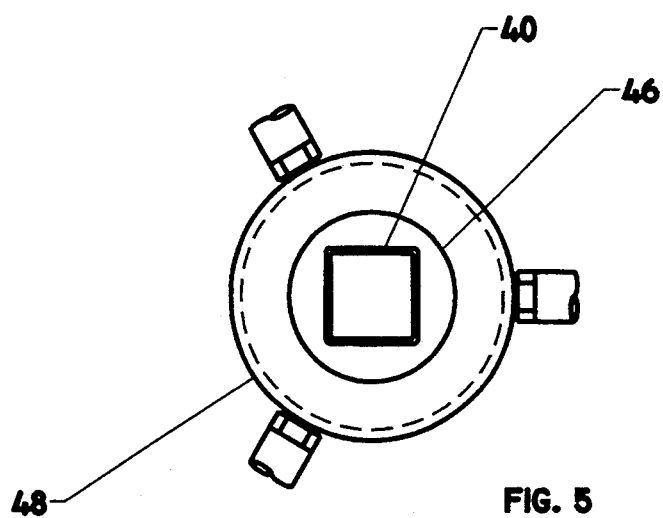
FIG. 5 is an end view of an impulse type vacuum system according to one embodiment of the invention.
Figure 6:
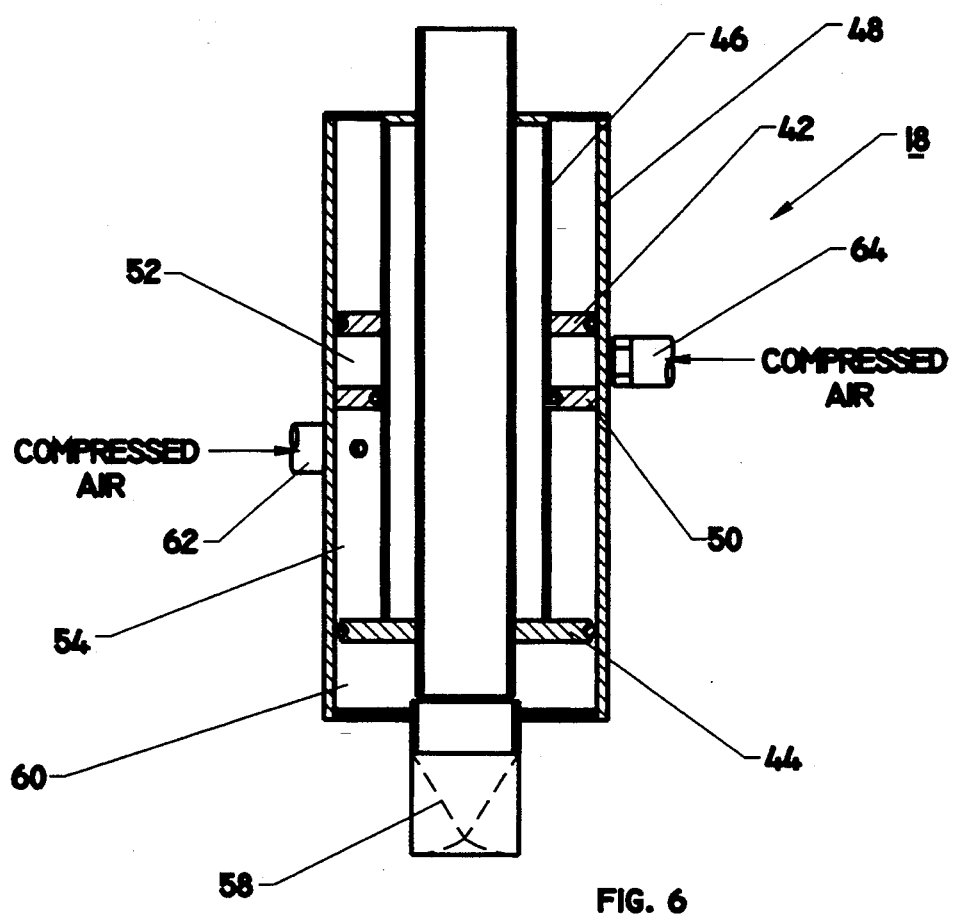
FIG. 6 is a cross sectional view of the embodiment of FIG. 5.

For the illustrated automatic transplanter a series of 8 pneumatically driven coaxial cylinder impulse type vacuum systems 18 are attached underneath of the bearing plate 16 at each opening in the plate 16. The upper end and cross-sectional views of one embodiment of the impulse vacuum system is illustrated in FIGS. 5 and 6. The system integrates a coaxial cylinder and drop tube into an optimum compact configuration by combining three tubings together along a common axis. The inner, square (28 mm×28 mm or $1\frac{1}{8}"\times 1\frac{1}{8}"$) drop tubing 40 guides a seedling block 11, also referred to herein as simply a seedling. An inner cylindrical tube 46 (with associated O-ring sealing plates 42,44) is secured to the outside of drop tube 40, constituting the stationary portion of the coaxial cylinder. An outer cylinder 48 with an O-ring piston plate 50 is reciprocally mounted over the inner cylinder 46 to form airtight upper and lower annular pneumatic chambers 52, 54 for impulse actuation by feeding compressed air. The O-ring piston plate 50 separates the pneumatic chambers 52, 54. Disposed on the lower end of outer cylinder 48 is an openable and closable flexible door 58, to form a vacuum chamber 60 at the lower end of drop tube 40. This door 58 can be constructed of resilient material, plastic of any other suitable material that will close tight as the inside of the outer cylinder is subjected to a lower pressure than ambient.

Figure 4:
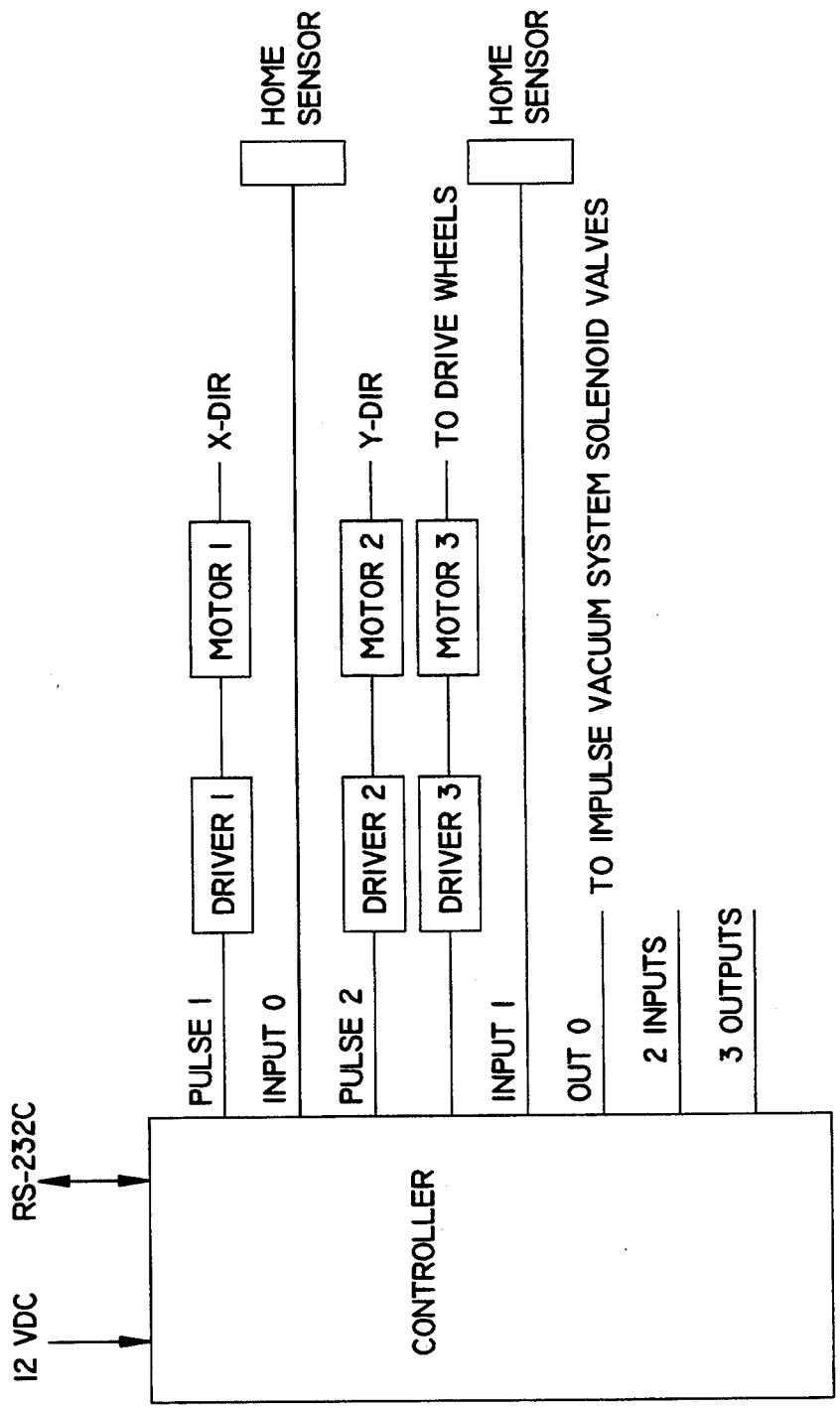
FIG. 4 is a block diagram of programmable control system for indexing, transferring, and transplanting operations.

Compressed air is selectively supplied through ports 62 and 64 in outer cylinder 48 by a small engine driven compressor with accumulator (not shown), controlled by a solenoid valve (not shown) to actuate the outer cylinder 48. The solenoid valve, in turn, is controlled by output from the computer controller shown in FIG. 4. The magnitude of the suction force can be controlled by controlling the air pressure. When the compressed air enters through the upper port 64, the outer cylinder moves down to enlarge a vacuum chamber 60, and the pressure within the tube 40 decreases instantly to create an impulse vacuum in the drop tube 40. The opposing atmospheric pressure instantly dislodges the seedling block 11 from tray cell 12, pushing the seedling down through the guide tube 40. The weight and inertia of the seedling block cause the block to shoot through the flexible door 58 onto the ground to achieve the transplanting. All forces act on the seedling in the downward direction of seedling movement, and therefore, no lateral deviation exists during the operation. This ensures proper, shallow transplanting for increased yields.

As the transplanting operation is completed, the system computer controls the solenoid valve to reverse the compressed air flow to enter through port 62 while port 64 is vented to the atmosphere. This raises outer cylinder 48 back to it original position, ready for the next operation. It should be noted that the computer controlled solenoid valve is preferably actuated in a synchronized time relationship with the drive wheels or conveyors and the movement of the plant trays over the drop tubes by the indexing apparatus 14. Those of ordinary skill in the art can suitably program the controller shown in FIG. 4 to achieve this result. Once the next succeeding tray cells are properly aligned over the drop tubes, the plant transfer system is ready to dispense another set of 8 seedling blocks. The impulse vacuum systems, of which one is shown in FIG. 6, are once again actuated so as to induce another set of 8 seedling blocks downwardly through the drop tubes. The programmable control system automatically index the trays to move in X-direction or Y-direction on the bearing surface for the next operation until the tray is completely emptied.

SIMULATION ANALYSIS AND SYSTEM PERFORMANCE

Due the high speed impulse actions of the pneumatic cylinder pulling the seedlings from the tray bottom openings, the entire system dynamics can best be analyzed using computer simulation to predict the system performance.

Basic Theory and Modeling

1. Outer Cylinder Dynamics

According to Boyle's law, at a constant temperature the volume occupied by a given weight of air varies inversely as the absolute pressure:

$$V/V1 = P1/P \qquad (1)$$

where V is the volume of a given weight of air at an absolute pressure P and a certain temperature; V1 is the volume of the same weight of air at the same temperature at any absolute pressure P1.

As shown in FIG. 6, the initial volume of the drop tube 40 is substantially all of the air volume. During the suction stroke of outer cylinder 48, the effective volume of the drop tube volume increases, and the pressure within the drop tube decreases instantly to generate an impulse vacuum.

According to the Newton's second law, $$dv/dt = f/m \qquad (2)$$

where v and dv/dt are respectively the linear velocity and the acceleration of outer cylinder 48, t is the time, and f is the total force acting on the cylinder with the mass, m.

Applying Equation (1) to the cylinder dynamics, the following equation can be written as $$f = 3.14*(D2*D2 - D1*D1)*p/4 - A2*\Delta p$$
$$-\text{friction} + \text{weight of outer cylinder} - R \qquad (3)$$

where D2 is the inner diameter of outer cylinder, D1 is the outer diameter of inner cylinder, p is the pressure of compressed air, and $\Delta p$ is the difference between the pressure within the drop tube and atmospheric pressure, A2 is the inner bottom area of outer cylinder on which $\Delta p$ is applied, and R is the flow resistance of air while the cylinder moves with a high speed.

Assume that $$R = a*A2*v \qquad (4)$$

where a is a constant.

$$\Delta p = p2 - p1 \qquad (5)$$

in which $$p2 = 14.7 \text{ psi}$$

From Equation (1)

$$p1 = p2(1 - V1/V2) \qquad (6)$$

where V1 is the initial air volume within the drop tube and V2 is the final volume of the chamber including the drop tube volume after expansion. It is apparent the V2 is the function of time, that is $$V2 = v*t*A2 + V1 \qquad (7)$$

Thus, the acceleration equation of the outer cylinder is a nonlinear differential equation which is a function of both cylinder velocity and time.

$$dv/dt = F(v, t) \qquad (8)$$

2. Seedling Block Dynamics

Seedling block dynamics can be analyzed for three distinct periods. The first period is the instant, $\Delta t$ the seedling block is dislodged from the tray cell. During this period the atmospheric pressure is applied to the open area of the seedling block in the cell top and the pressure below will be as caused by the movement of the cylinder, as defined above. As soon as the seedling block is dislodged, the atmospheric pressure will be applied to the bottom area of the seedling block, and therefore, the second period is from the dislodging of the seedling block until the block reaches the flexible door 58. The third period begins with the shooting-out of the seedling block from the door 58 until it reaches the ground. The forces acting onto the seedling block for each period can be defined as F1, F2, and F3, and can be written as $$F1 = p2*Act*[1 - A*\Delta L/(A*\Delta L + v*\Delta t*A2 - *A2*3.14/4)] + Ws - Rf \qquad (9)$$

$$F2 = p2*Acb*[1 - A*L/(A*L + v*t*A2*A2*3.14/4)]$$
$$+ Ws - Rf - a*Acb*vs \qquad (10)$$

$$F3 = Ws - a*Acb*vs \qquad (11)$$

in which

Act is the open area of a tray cell top,
Acb is the open area of a tray cell bottom,
A is the cross-sectional area of drop tube,
L is the length of drop tube,
$\Delta L$ is the fraction of seedling block displacement at the instance of dislodging,
Ws is the weight of a seedling block,
Rf is the friction force acting on the seedling block while it is dropping,
vs is the velocity of seedling block while it is dropping.

According to the Newton's second law, $$dvs/dt = F/ms \qquad (12)$$

where F is the force (F1, F2, and F3) acting on the seedling block, ms is the mass of a seedling block and dvs/dt is the acceleration of seedling block. Apparently, the acceleration is the function of seedling velocity, cylinder velocity and time. That is $$dvs/dt = F(v, vs, t) \qquad (13)$$

The energy change of the seedling block is the kinetic energy increment and potential energy decrement. The kinetic energy increment, KE, can be written as $$KE = ms*vs*vs/2 - ms*vs0*vs0/2 \qquad (14)$$

and potential energy decrement, PE, can be written as $$PE = Ws*(h - h0) \qquad (15)$$

where vs0 is the initial velocity of seedling block, h0 is the initial height of the seedling block at the transplanter bearing plate 16 which is considered as zero position, and h is the position of seedling block during the drop, measured with the downward direction as positive.

As the seedling block reaches the field surface, plastic deformation occurs for the block and soil at the impact. The kinetic energy, ms*vs*vs/2, will be absorbed by the deformation as the seedling block velocity, vs, approaches zero. Thus, the impact energy can be adjusted by adjusting the height of transplanter bearing plate and the impulse vacuum system.

Simulation Analysis

The simulation models contain all possible factors, including the resistance from air flow and friction, although the influence of some factors is small for given conditions. For the simulation analysis the Equations (2) and (12) can be solved by using Runge-Kutta method with adaptive stepsize control.

The initial conditions for the simulation are as follows:

For the outer cylinder with 2.3 in. stroke
$v=0$,
$dv/dt=0$, and
$h0=5''$.

For the seedling block
$vs=0$,
$dvs/dt=0$,
$h0=0$.
$\Delta L=0.04''$

Since an activating pressure is closely related to the cylinder speed and impulse vacuum to be generated, simulation analysis was performed for the activating pressures of 50, 60, 70, 80, and 90 psi to check the performance of the impulse system as related to the seedling block dynamics. From a machine design point of view, it is desirable to achieve high performance with a lower activating pressure. The preliminary studies indicated that the performance at 80 and 90 psi did not result in improvement of the overall performance. This is because for a vacuum system the maximum pressure obtainable from the atmospheric pressure is 14.7 psi. The simulation analysis showed that the impulse vacuum system could generate 13.3 psi in less than 0.005 seconds indicating that the system is very effective in generating high vacuum in a short period of time for all the activating pressures tested. The simulation results for 50, 60, and 70 psi activating pressures are shown in FIGS. 7 and 8.

Figure 7:
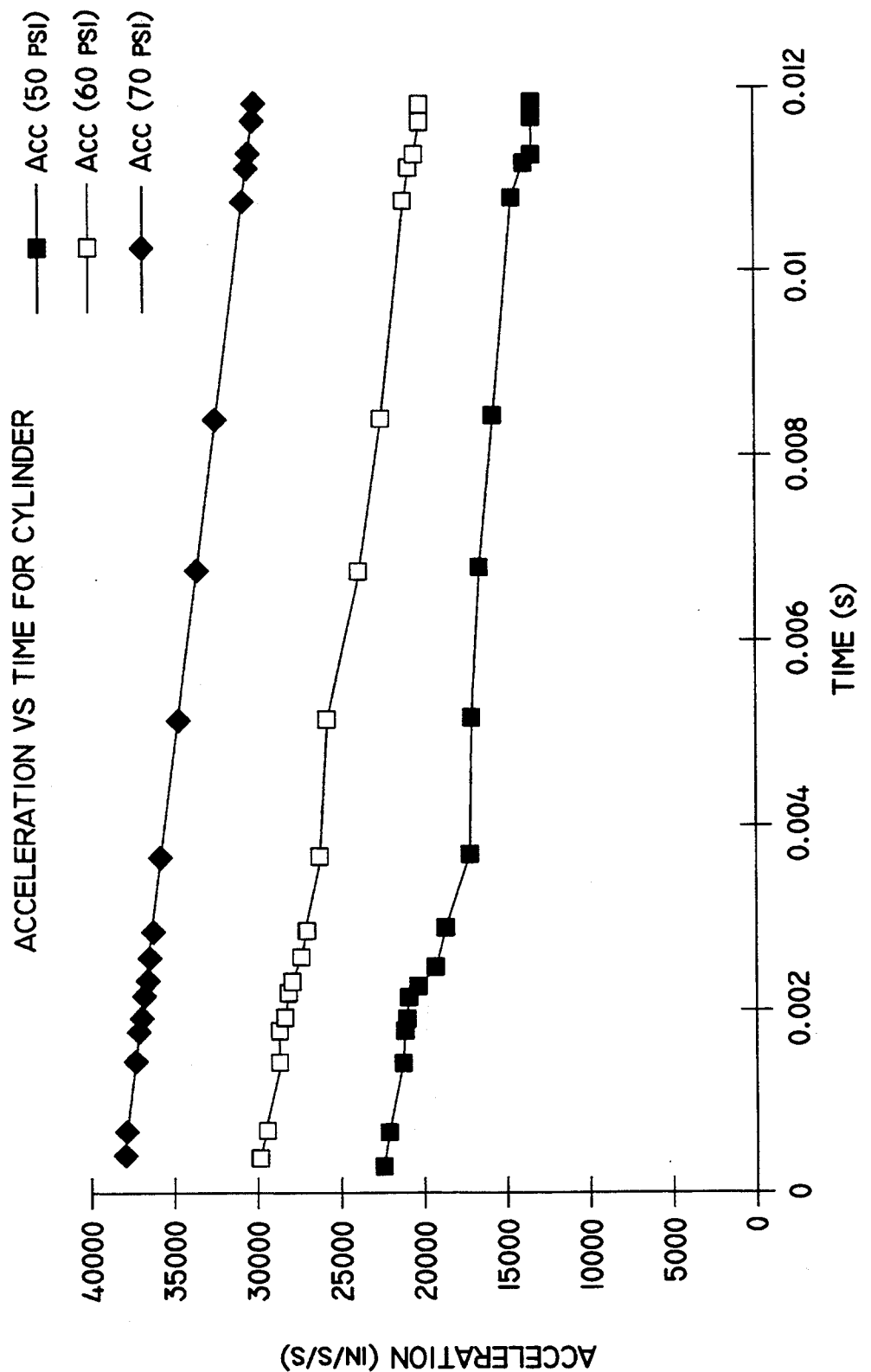
FIG. 7 is a graph of cylinder acceleration versus time curves for 50, 60, and 70 psi activating pressures.

FIG. 7 shows the acceleration versus time curve for the outer cylinder at 50, 60, and 70 psi activating pressures. The Figures show that the higher the activating pressure, the larger the initial acceleration. However, at 70 psi the rate of decrease in acceleration is larger, and therefore, the cylinder velocity curves for 60 and 70 psi are almost the same.

Figure 8:
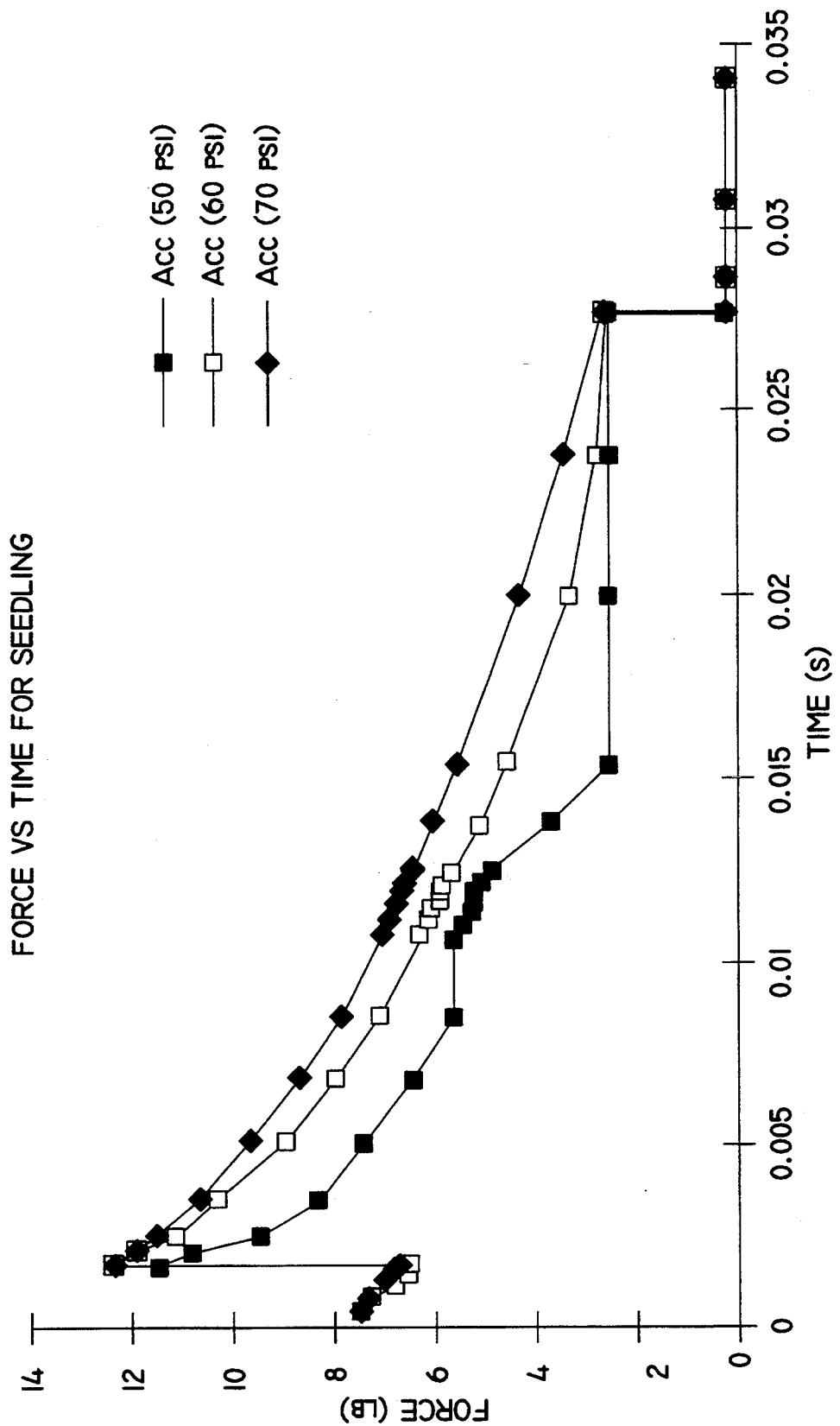
FIG. 8 is a graph of forces acting on seedling blocks versus time curves for 50, 60, and 70 psi activating pressures.

FIG. 8 shows the force acting on the seedling block, versus time for 50, 60, and 70 activating pressures. There is distinct increase in force and, therefore, acceleration from the first period to second period due to increased area after the seedling block is dislodged. After the seedling block is shot out from the flexible door (third period) the gravitational acceleration continues to act on the seedling block until it reaches the ground. The seedling block reaches the flexible door in 0.035 s for all pressures and reaches the ground to achieve the automated transplanting at 0.06 s for 70 psi and at 0.08 s for 60 psi pressures.

The overall results of computer simulation indicate that the impulse vacuum system has the best performance for 60 psi activating pressure. Other factors, such as the weight of moving parts (outer cylinder), the size of outer cylinder including stroke and diameter and their interaction, may also affect performance.

Figure 9:
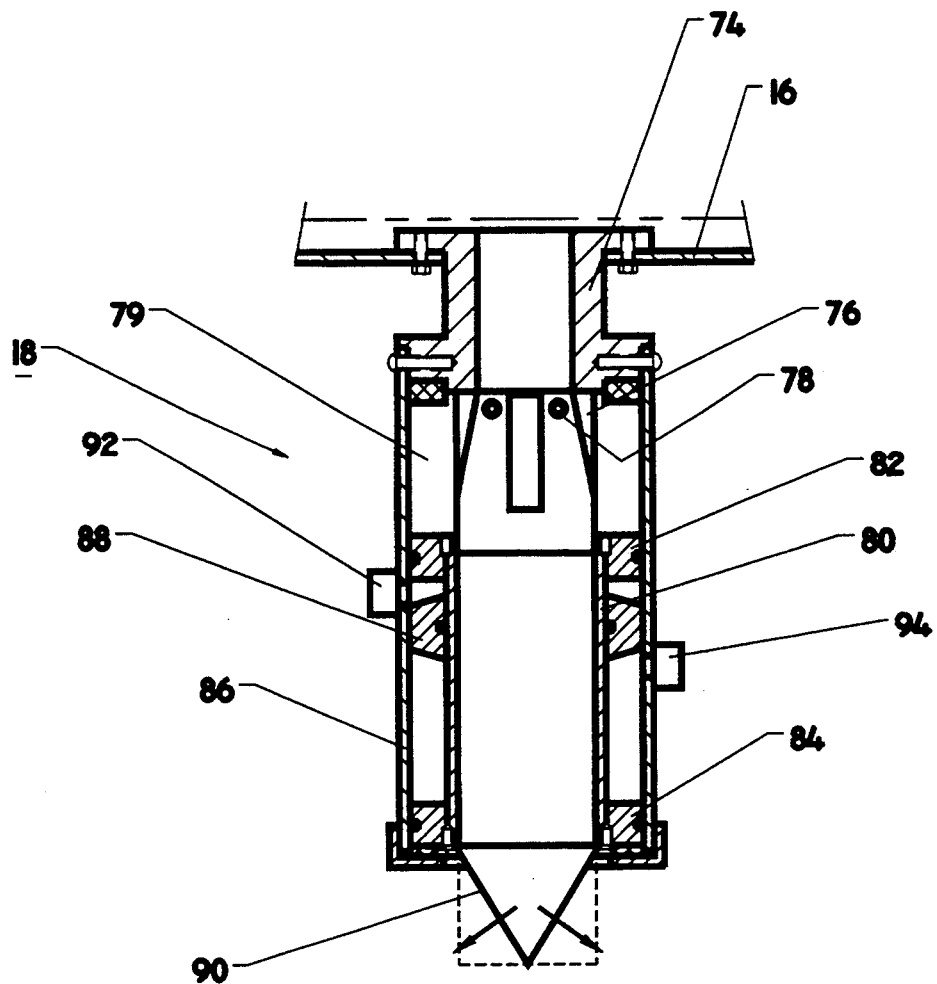
FIG. 9 is a cross-sectional view of an alternate embodiment for the impulse vacuum apparatus.

Referring to FIG. 9, an alternate embodiment for creating a suction impulse is shown. Here, the suction tube 18, as before, is affixed to an opening in the bearing plate 16. The guide tube has a primary portion 74 and a secondary, wider section 76. As can be seen in the Figure, the central bore or lumen of the guide tube 74 increases from a narrower to a wider portion in the downstream portion 76. A plurality of radially symmetrically spaced ports 78 open outwardly into a vacuum chamber 79. The vacuum is developed in chambers 79, and the radially symmetrical placement of the ports 78 assures that the vacuum pulled in the guide tube 74 does not have a lateral component, which could lead to the tilting or tipping of the seedling, causing it to be planted improperly.

An extension portion 80 for the guide tube 74 is mounted as an outwardly located, telescoping sleeve on the portion 76, capable of sliding onto or extending from the portion 76.

Radially outward of the extension and sleeve is an outer tube 86 affixed to the outer portion of the guide tube 74. Interposed between the extension 80 and the outer tube 86 are rings 82, 84 and 88. The ring 88 is affixed to the outer tube 86 with an O-ring permitting sealing, sliding motion of the extension 80 within. The rings 82 and 84 are affixed to the ends of the extension 80 and have O-rings permitting sliding, sealing motion with respect to the outer tube 86.

Compressed air input ports 92 and 94 are provided above and below the ring 88, respectively. A collapsible door 90, like the one described above is affixed to the lower end of the extension 80.

In the view of FIG. 9, a vacuum has just been developed and used to discharge a seedling. In the planting mode, however, the extension 80 is raised up to substantially entirely cover the portion 76 of the guide tube, resulting in the vacuum chamber 79 being of small volume. Similarly, the lower annular chamber between the ring 88 and ring 84 is of small volume, since the ring 84 will have been raised up by the motion of the extension 80 from the position shown in FIG. 9. The injection of compressed air in through port 94 will rapidly expand the size of the lower annular chamber and will also greatly and rapidly expand the size of the vacuum chamber 79. Thus, air in the guide tube 74 will be sucked into the chamber 79 through port 78, causing the quick build-up of vacuum within the guide tube and result in the closing of the flexible door 90. Upon the closing of that door, the vacuum will build even faster, pulling the seedling down through the guide tube 74, 76 and the extension 80. As it passes the door 90, the door will open and the seedling can be planted.

Meanwhile, the extension will have moved to the position shown in FIG. 9. A second pulse of compressed air into port 92, with the venting of the port 94 the atmosphere will move the extension 80 back to the upper position, ready to transplant the next seedling, when the tray above has been indexed so a new seedling is in position.

The new approach to design of automated seedling transplanting system in conjunction with air-pruning technique has greatly increased accuracy and efficiency of automatic seedling transplanting in the field. The test results show that the automated transplanting rate is much higher compared with other conventional automatic seedling transplanters. The system also performs shallow transplanting, which is difficult to achieve with other machines.

The moving parts of the cylinder can be either an inside smaller tubing or an outside larger tubing, depending on the application. Generally, the smaller the moving parts, the better dynamic characteristics the system has. But, the size of the piston must be sufficient to provide a minimum rate of expansion in the vacuum chamber. The magnitude of the suction force is adjustable by changing the pressure of the input compressed air.

Those of ordinary skill in the art will appreciate that the invention can be carried out using various methods and apparatuses as variants on those shown above, and such methods and apparatus is deemed to be within the scope of the protected patent rights.

What is claimed is:

1. A seedling transplanter comprising:
    a bearing plate for a tray of seedlings to be planted in which the tray has open portions below the seedlings and the bearing plate has at least one opening which can be aligned with the open portions of the tray to permit a seedling to be dropped from the tray through the opening in the beating plate,
    a guide tube below the opening in the bearing plate for guiding a dropped seedling downward to be planted, an outer tube axially aligned with said guide tube, and
    a source of suction selectively applicable to said guide tube as an impulse of suction to quickly release the seedling to be planted from the tray and induce the seedling to fall through the opening in the bearing plate and into said guide tube and to continue to fall through said guide tube under the influence of gravity, said source of suction including first and second annular chambers between said guide tube and said outer tube, and a vacuum chamber in communication with said guide tube, whereby expansion of one of said annular chambers extends one of said tubes from an initial position in a downward direction to expand the vacuum chamber and create the impulse of suction and expansion of the other annular moves the extended tube in an upward direction to reduce the size of the vacuum chamber.

2. A transplanter as claimed in claim 1 wherein said source of suction's impulse expires quickly so that after being loosened from the tray, the seedling falls through said guide tube substantially free of suction as the impulse expires.

3. A transplanter as claimed in claim 1 wherein said guide tube has radially symmetrically arrayed ports in communication with said vacuum chamber to provide a suction impulse substantially free of a lateral component which could impart a lateral trajectory to the seedling.

4. A transplanter as claimed in claim 1 further comprising a height adjustment for said bearing plate, to adjust the height of the seedling to be transplanted and its potential energy for deformation upon planting.

5. A transplanter as claimed in claim 1 wherein said guide tube has an upstream portion and a downstream portion and said upstream portion has a smaller lumen than said downstream portion.

6. A transplanter as claimed in claim 1 wherein said source of suction comprises:
    an axially movable extension of said guide tube,
    an annular outer tube larger in diameter than said guide tube and having said guide tube and said extension within and having a closure at its upper end to close the annulus between the guide tube and outer tube,
    upper, medial and lower rings providing sliding seals between said outer tube and said extension thereby defining upper, lower and medial annular chambers between the tubes and above the respective rings,
    a suction port from said upper annular chamber to said guide tube to permit suction to be applied from said upper annular chamber to said guide tube, and
    compressed fluid supply ports to said lower and medial annular chambers so that compressed fluid may be selectively supplied to either chamber,
    whereby, upon application of compressed fluid to said lower chamber when said extension is at an upper position, said extension moves to a downward position extended from said guide tube and enlarging said upper annular chamber and drawing suction through said port from said guide tube.

7. A transplanter as claimed in claim 6 further comprising a closure for said guide tube adapted to close when suction is applied to said guide tube and to open when suction is released.

8. A transplanter as claimed in claim 7 wherein said closure is flexible.

9. A transplanter as claimed in claim 7 wherein said closure is located on said extension.

10. A transplanter as claimed in claim 7 wherein said upper and lower rings are fixed to said extension and have seals to permit sliding motion with respect to said outer robe and said medial ring is fixed to said outer robe and has a seal to permit sliding motion of said extension within said outer tube.

11. A transplanter as claimed in claim 6 further comprising a compressed fluid supply including a control to selectively apply compressed air to said lower annular chamber to move said extension to the downward position to remove a seedling from the tray and subsequently to apply compressed air to said medial annular chamber to return said extension to the upper position, ready for a subsequent transplanting.

12. A transplanter as claimed in claim 1 wherein said source of suction comprises:
    an annular inner tube larger in diameter than said guide tube and having said guide tube within and having a closure at its upper end to close the annulus between the guide tube and inner tube,
    an outer tube larger in diameter than said inner tube and having said guide tube and said inner tube within and being axially movable with respect to said inner tube,
    upper, medial and lower rings providing sliding seals between said inner and outer tubes, thereby defining upper and lower annular chambers between the tubes and between the rings,
    a bottom closure at the bottom of said outer tube adapted to close under the influence of a low pressure within said outer tube and to open when the low pressure is removed, and
    compressed fluid supply ports to said lower and upper annular chambers so that compressed fluid may be selectively supplied to either chamber,
    whereby, upon application of compressed fluid to said upper chamber when said outer tube is at an upper position, said outer tube moves to a downward position extended from said guide tube, said bottom closure closes forming an enlarging chamber at a lower end of said guide tube and drawing suction through said guide tube.

13. A transplanter as claimed in claim 12 further comprising a compressed fluid supply including a control to selectively apply compressed air to said upper annular chamber to move said outer tube to the downward position to remove a seedling from the tray and subsequently to apply compressed air to said lower annular chamber to return said outer tube to the upper position, ready for a subsequent transplanting.

14. A transplanter as claimed in claim 12 wherein said closure is a flexible closure aligned with said guide tube.

15. A seedling transplanter comprising:
- a bearing plate for a tray of seedlings to be planted in which the tray has open portions below the seedlings and the bearing plate has at least one opening which can be aligned with the open portions of the tray to permit a seedling to be dropped from the tray through the opening in the bearing plate.
- a height adjustment for said bearing plate, to adjust the height of the seedling to be transplanted and its potential energy for deformation upon planting,
- a guide tube below the opening in the bearing plate for guiding a dropped seedling downward to be planted, said guide tube having an upstream portion and a downstream portion and said upstream portion having a smaller lumen than said downstream portion,
- an axially movable extension of said guide tube,
- a flexible closure for said guide tube adapted to close when suction is applied to said guide tube and to open when suction is released,
- an outer tube larger in diameter than said guide tube and having said guide tube and said extension within and having a closure at its upper end to close the annulus between the guide tube and outer tube,
- upper, medial and lower rings providing sliding seals between said outer tube and said extension thereby defining upper, lower and medial annular chambers between the tubes and above the respective rings, said upper and lower rings being fixed to said extension and having seals to permit sliding motion with respect to said outer tube and said medial ring being fixed to said outer tube and having a seal to permit sliding motion of said extension within said outer tube, radially symmetrically arrayed ports in said guide tube to said upper annular chamber to permit suction to be applied from said upper annular chamber to said guide tube substantially free of a lateral component which could impart a lateral trajectory to the seedling, so that upon application of compressed air to said lower chamber when said extension is at an upper position, said extension moves to a downward position extended from said guide tube and enlarging said upper annular chamber and drawing air through said ports from said guide tube,
- compressed air supply ports to said lower and medial annular chambers so that compressed air may be selectively supplied to either chamber,
- a compressed air supply including a control to selectively apply compressed air to said port in said lower annular chamber to move said extension to the downward position to remove a seedling from the tray and subsequently to apply compressed air to said port in said medial annular chamber to return said extension to the upper position, ready for a subsequent transplanting,
- thereby providing a source of suction selectively applicable to said guide tube as an impulse of suction to quickly release the seedling to be planted from the tray and induce the seedling to fall through the opening in the bearing plate and into said guide tube and to continue to fall through said guide tube under the influence of gravity, with an energy upon planting predominantly determined by its original potential energy.

16. A seedling transplanter comprising
- a bearing plate for a tray of seedlings to be planted in which the tray has open portions below the seedlings and the bearing plate has at least one opening which can be aligned with the open portions of the tray to permit a seedling to be dropped from the tray through the opening in the bearing plate,
- a guide tube below the opening in the bearing plate for guiding a dropped seedling downward to be planted, and
- a source of suction selectively applicable to said guide tube, said source of suction comprising a first chamber in communication with said guide tube and having a moveable wall so as to be capable of having its volume enlarged,
- a second chamber having a moveable wall so as to be capable of having its volume changed, said movable wall of said second chamber being linked to said movable wall of said first chamber, and
- a compressed air inlet to said second chamber, so that upon admission of compressed air to said second chamber, the movable wall of said second chamber moves, thereby forcing said movable wall of said first chamber in a direction to increase its volume and create suction in the guide tube.

* * * * *